United States Patent
Pandey et al.

(10) Patent No.: US 9,860,692 B2
(45) Date of Patent: Jan. 2, 2018

(54) DETERMINING LOCATION VIA CURRENT AND PREVIOUS WIRELESS SIGNAL ATTRIBUTES

(71) Applicant: Cisco Technology, Inc., San Jose, CA (US)

(72) Inventors: Santosh Pandey, Newark, CA (US); Rong Peng, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/172,711

(22) Filed: Jun. 3, 2016

(65) Prior Publication Data
US 2017/0280281 A1   Sep. 28, 2017

Related U.S. Application Data

(63) Continuation-in-part of application No. 15/077,883, filed on Mar. 22, 2016, now Pat. No. 9,749,786.

(51) Int. Cl.
*H04W 4/02*        (2009.01)
*H04B 17/318*    (2015.01)
*G01C 21/20*      (2006.01)

(52) U.S. Cl.
CPC .......... *H04W 4/02* (2013.01); *G01C 21/206* (2013.01); *H04B 17/318* (2015.01)

(58) Field of Classification Search
CPC ..... H04W 64/00; H04W 4/023; H04W 24/02; H04W 24/10; H04W 16/28; H04W 24/08;
(Continued)

(56) References Cited

U.S. PATENT DOCUMENTS

2013/0053056 A1*  2/2013  Aggarwal ............. G01S 5/0263
                                                                                    455/456.1
2014/0241175 A1*  8/2014  Schell .................... H04W 4/06
                                                                                    370/252
(Continued)

OTHER PUBLICATIONS

Mizrahi, "Office Action issued in U.S. Appl. No. 15/077,883, filed Mar. 22, 2016", dated Jan. 24, 2017.
(Continued)

*Primary Examiner* — Diane Mizrahi
(74) *Attorney, Agent, or Firm* — Johnson, Marcou & Isaacs, LLC

(57) ABSTRACT

Determining a location of a user device comprises a wireless system supported by wireless access points receiving signals from a user device. The wireless system estimates a location of the user device based on a coarse calculation based on an angle of arrival of the received signal and determines if the user device is in an area under an access point. The wireless system identifies received signal strength indicator values for the user device and uses the values and the calculated location of the user device to improve calibration of a received signal strength location model. If the system determines that the user is not in the area under the access point, the wireless system combines the coarse calculation location, a received signal strength determined location, and a previous received signal strength determined location, and estimates a location based on the combined calculations.

20 Claims, 7 Drawing Sheets

(58) Field of Classification Search
CPC ......... H04W 28/0236; H04W 28/0268; H04W 28/0284; H04W 28/24; H04W 40/22; H04W 48/06; H04W 4/001
See application file for complete search history.

(56) References Cited

U.S. PATENT DOCUMENTS

| | | |
|---|---|---|
| 2015/0312719 A1 | 10/2015 | Cho et al. |
| 2016/0274215 A1 | 9/2016 | Edge et al. |
| 2016/0380363 A1* | 12/2016 | Logothetis .......... H04L 41/0806 343/853 |
| 2016/0381591 A1* | 12/2016 | Lysejko .............. H04L 41/0806 370/252 |

OTHER PUBLICATIONS

U.S. Appl. No. 15/077,883 to Pandey et al. filed Mar. 22, 2016.
U.S. Appl. No. 15/662,111 to Pandey et al. filed Jul. 27, 2017.

* cited by examiner

DETERMINING LOCATION VIA CURRENT AND PREVIOUS WIRELESS SIGNAL ATTRIBUTES

CROSS-REFERENCE TO RELATED APPLICATIONS

This application is a continuation-in-part of and claims priority to U.S. patent application Ser. No. 15/077,883, filed Mar. 22, 2016, and entitled "Determining Location via Wireless Signal Attributes." The entire disclosure of the above-referenced priority application is hereby fully incorporated herein by reference.

TECHNICAL FIELD

This disclosure relates to determining a computing device location via wireless signal attributes and more specifically to using angle of arrival of received signals to refine a location determination of a user computing device that is based on received signal strength. The present disclosure further relates to combining the angle of arrival and received signal strength locations with a previous received signal strength location determination to improve location results.

BACKGROUND

Wireless computing systems that provide Internet services and other wireless signal services to user computing devices, such as mobile smartphones, are deployed in many public locations. For example, a mall or a hotel may deploy a wireless access point to provide a wireless network connection to a user computing device. A facility may provide multiple wireless access points to cover a larger area. For example, a sports arena may provide many wireless access points to allow wireless network access for users throughout the facility.

A conventional wireless computing system may use the wireless access points to determine a location of a particular user computing device and offer services to the particular user computing device based on the determined location. In an example, the location of the particular user computing device may be employed by the particular user computing device when accessing a mapping application or a shopping application. Errors in the determined location may result in providing incorrect or incomplete services to the particular user computing device.

DESCRIPTION OF EXAMPLE EMBODIMENTS

Overview

Figure 1:
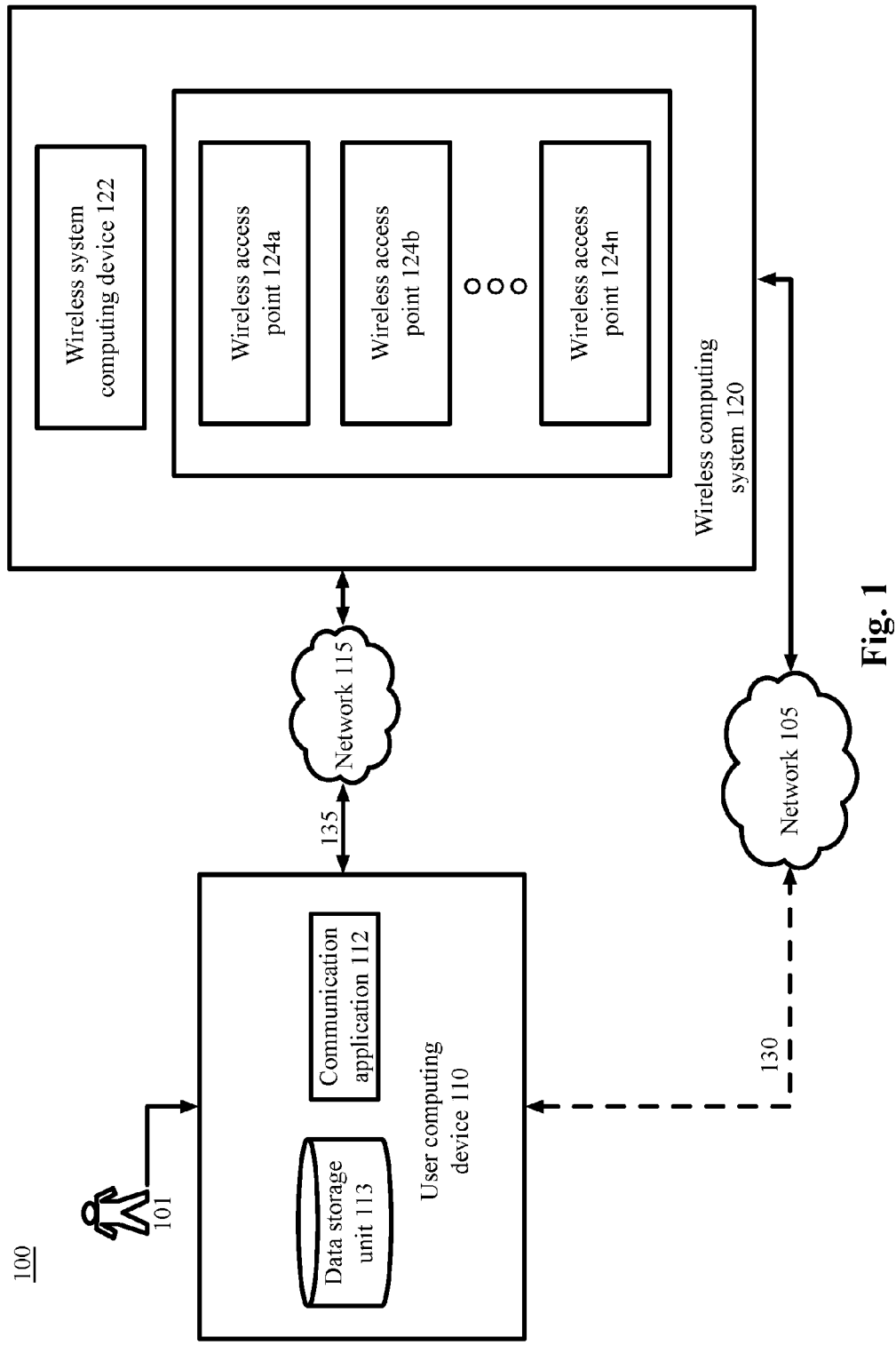
FIG. 1 is a block diagram depicting a system to determine a location of a user computing device, in accordance with example embodiments.

In an example embodiment, a user enters a location having a wireless computing system. The wireless computing system includes a wireless access point ("AP"). Multiple APs may be deployed to improve the coverage area of the wireless computing system. One or more APs receive a signal from a user computing device. The signal may be in response to a beacon signal provided by the one or more APs.

The wireless computing system determines an estimated location of the user computing device based on a result of a coarse calculation using an angle of arrival ("AoA") of the signal received by the one or more APs from the user computing device.

The wireless computing system determines if the user computing device is likely to be in a location that is receiving an accurate signal due to a proximity to an AP. The accurate signal location may be depicted as a cone underneath the AP in which the AP receives a full uninterrupted signal from the user computing device when the user computing device is located in the cone underneath the AP.

If the wireless computing system determines that the user is likely to be in the accurate signal location, then the wireless computing system performs a fine calculation of the user computing device's location for display to the user. The fine calculation provides a more accurate location based on a more thorough analysis of the AoA data from a smaller area.

The wireless computing system further identifies a received signal strength of a signal received by the one or more APs from the user computing device and determines a received signal strength indicator ("RSSI") for the signal with respect to each AP that received the signal from the user computing device. The wireless computing system uses the RSSI values with respect to each AP and the determined location of the user computing device obtained by the fine AoA calculation to improve calibration of location determining models based on RSSI.

If a determination based on a subsequent signal determines that the user is not likely to be in an accurate signal location, then the wireless computing system obtains an RSSI-based location from each AP receiving a signal from the user computing device. The RSSI-based location is determined based on the RSSI of the user computing device signal with respect to each AP that receives the signal, including triangulating of the location with respect to each AP.

The wireless computing system may determine whether a previous RSSI location calculation occurred more recently than a configured time interval. For example, the wireless computing system determines the location of the user with the methods described herein on any determined schedule, such as every 5 seconds, 10 seconds, 20 seconds or other suitable time period, including when another AP receives a signal from the user computing device. The location determination may be updated on another suitable schedule, such as only when a particular application is opened or accessed on the user computing device. The wireless computing system stores the previous determinations and timestamps the previous determinations for later access.

The wireless computing system determines if the previous calculation occurred more recently than a configured amount of time in the past. For example, the configured time may be 30 seconds. If the previous calculation occurred more than 30 seconds previously, then the wireless computing system will not use the previous calculation in the current location determination. If the previous calculation occurred less than 30 seconds ago, then the wireless computing system will use the previous location determination. If the previous location is determined to be usable, then the wireless computing system assesses the previous RSSI-based location determination for use in the current combined location determination.

After determining the current RSSI-based location and determining that the previous RSSI-based location was determined more recently than the configured time, the wireless computing system combines the previously determined coarse calculation location based on the AoA with the current RSSI location calculation and the previous RSSI location calculation. The wireless computing system determines an estimated location based on the combined calculations from the AoA calculation and the current RSSI and previous RSSI calculations. The combined location calculation typically is more accurate than either of the coarse AoA calculation or the RSSI calculations conducted independently.

If the previous RSSI calculation occurred at a time before the configured time threshold, then the wireless computing system calculates an estimated location based on the combined calculations from the AoA and the current RSSI, and omits the previous RSSI calculation.

In alternate embodiments, the combined calculation may utilize other stored data in addition to, or instead of, any of the three sources of data listed above. For example, the wireless computing system may utilize the previously calculated coarse AoA from the last location calculation. In another example, the wireless computing system may utilize the previous combined calculation from a combination of the AoA data, RSSI data, or other suitable data.

The wireless computing system may combine any or all of this previous data with the current data to perform the determination. The determination may use the previous data in any suitable manner, such as by ensuring that the new search area includes the location from the previous data. Using the previously determined location as an input reduces error in the determined results.

Example System Architectures

Turning now to the drawings, in which like numerals represent like (but not necessarily identical) elements throughout the figures, example embodiments are described in detail.

FIG. 1 is a block diagram depicting a system 100 to determine a location of a user computing device 110, in accordance with example embodiments.

As depicted in FIG. 1, the system 100 includes a user computing device 110 and a wireless computing system 120 that are configured to communicate with one another via one or more networks 105, 115 or via any suitable communication technology. The wireless computing system 120 employs one or more wireless access points ("APs") 124a-n. Three APs 124a, 124b, and 124n are depicted in FIG. 1. However, the wireless computing system 120 may include any suitable number of APs 124 as configured for a particular wireless computing system 120. The APs 124a-n may sometimes be identified throughout this specification individually as APs 124a-n or collectively as AP 124n.

Each network, such as networks 105 and 115, includes a wired or wireless telecommunication mechanism and/or protocol by which the components depicted in FIG. 1 can exchange data. For example, each network 105, 115 can include a local area network ("LAN"), a wide area network ("WAN"), an intranet, an Internet, a mobile telephone network, storage area network (SAN), personal area network (PAN), a metropolitan area network (MAN), a wireless local area network (WLAN), a virtual private network (VPN), a cellular or other mobile communication network, Bluetooth, NFC, Wi-Fi, or any combination thereof or any other appropriate architecture or system that facilitates the communication of signals or data. Throughout the discussion of example embodiments, it should be understood that the terms "data" and "information" are used interchangeably herein to refer to text, images, audio, video, or any other form of information that can exist in a computer-based environment. The communication technology utilized by the components depicted in FIG. 1 may be similar to network technology used by networks 105, 115 or an alternative communication technology.

Each component depicted in FIG. 1 includes a computing device having a communication application capable of transmitting and receiving data over the networks 105, 115 or a similar network. For example, each can include a server, desktop computer, laptop computer, tablet computer, a television with one or more processors embedded therein and/or coupled thereto, smart phone, handheld or wearable computer, personal digital assistant ("PDA"), other wearable device such as a smart watch or glasses, wireless system access point, or any other processor-driven device.

In the example embodiment depicted in FIG. 1, the user computing device 110 is operated by an end-user or consumer 101, and the wireless computing system 120 is operated by a wireless system operator (not depicted).

As shown in FIG. 1, the user computing device 110 includes a data storage unit 113 accessible by a communication application 112. The example data storage unit 113 can include one or more tangible computer-readable storage devices. The data storage unit 113 can be disposed on the user computing device 110 or can be logically coupled to the user computing device 110. For example, the data storage unit 113 can include on-board flash memory and/or one or more removable memory devices or removable flash memory. In example embodiments, the data storage unit 113 may reside in a cloud based computing system. The data storage unit 113 may store instructions executable by the user computing device 110 to perform the functions described herein.

In an example embodiment, the communication application 112 of the user computing device 110 communicates with the APs 124n over the network 115 via communication path 135 using Wi-Fi or other wireless communication technology, such as Bluetooth, infrared, or other suitable technology. The user computing device 110 may access the Internet or other systems via the APs 124n. In an example embodiment, when the user computing device 110 communicates with the wireless computing system 120 via the network 115, the user computing device 110 may access the network 105 via the wireless computing system 120. That is, the user computing device 110 may utilize the wireless computing system's 120 connection to the network 105 to access the Internet or any other system or device.

In an alternate example embodiment, the communication application 112 communicates with the Internet, the wireless computing system 120, or other suitable systems or devices, via a connection to the network 105 along communication path 130. The communication path 130 may be a cellular communication technology or any other suitable technology, such as Wi-Fi. The user computing device 110 may utilize communication path 130 to network 105 to communicate when the communication path 135 via network 115 is not available. For example, if the user computing device 110 is out of range of a signal from APs 124n, then the user computing device 110 may instead use a cellular connection to network 105 via communication path 130. In an example, the user computing device 110 may use communication path 135 via network 115 as a path to access the Internet because this connection, such as a Wi-Fi connection, may consume less of the bandwidth, battery power, or data allowance of the user computing device 110 compared to the communication path 130.

The communication application 112 on the user computing device 110 may be, for example, a web browser application or a stand-alone application, to view, download, upload, or otherwise access documents or web pages via the networks 105, 115. The communication application 112 can interact with web servers or other computing devices connected to the network 105.

In some embodiments, the user 101 associated with a user computing device 110 can install an application and/or make a feature selection to obtain the benefits of the techniques described herein.

As shown in FIG. 1, the wireless computing system 120 includes a wireless system computing device 122 and the APs 124a-n. The wireless system computing device 122 may be a server or other device that is used to perform the computing functions of the wireless computing system 120 and to coordinate communication to/from the APs 124a-n. In an example, the wireless system computing device 122 is used to configure the wireless technologies utilized by the APs 124. The wireless system computing device 122 stores received data, performs calculations related to the location of the user computing device 110, or performs any other suitable actions. Any other computing or storage function required by the wireless computing system 120 may be performed by the wireless system computing device 122.

Any function performed in the methods described herein by the APs 124n may be performed by any one or more of the APs 124a, 124b . . . 124n, unless otherwise specified. Any function performed in the methods described herein by the APs 124n may be performed by the wireless system computing device 122 or other computing system associated with the APs 124n. Any function performed in the methods described herein by the wireless system computing device 122 may be performed by one or more of the APs 124n or other computing system associated with the APs 124n or the wireless computing system 120.

Each AP 124n comprises hardware and software to communicate with the user computing device 110 or the network 105 via any suitable communication technology. For example, each AP 124n may utilize an antenna or other hardware to improve transmission/reception of wireless signals. Each AP 124n may communicate with the networks 105, 115 or the user computing device 110 via Wi-Fi or other wireless communication technology, such as Bluetooth, infrared, cellular, or other suitable technology. The APs 124n may be in communication with a wireless system computing device 122 that manages the operations of the APs 124n. The APs 124n may be wired or otherwise logically coupled to the wireless system computing device 122 to allow access to the network 105 or for any other suitable purpose. The calculation functions or other processing functions of the APs 124n may be performed by a processor or other computing system onboard the AP 124n or of the wireless computing system 120. Additionally, the functions of the wireless computing system 120 may be performed by the APs 124n or the wireless system computing device 122.

Figure 7:
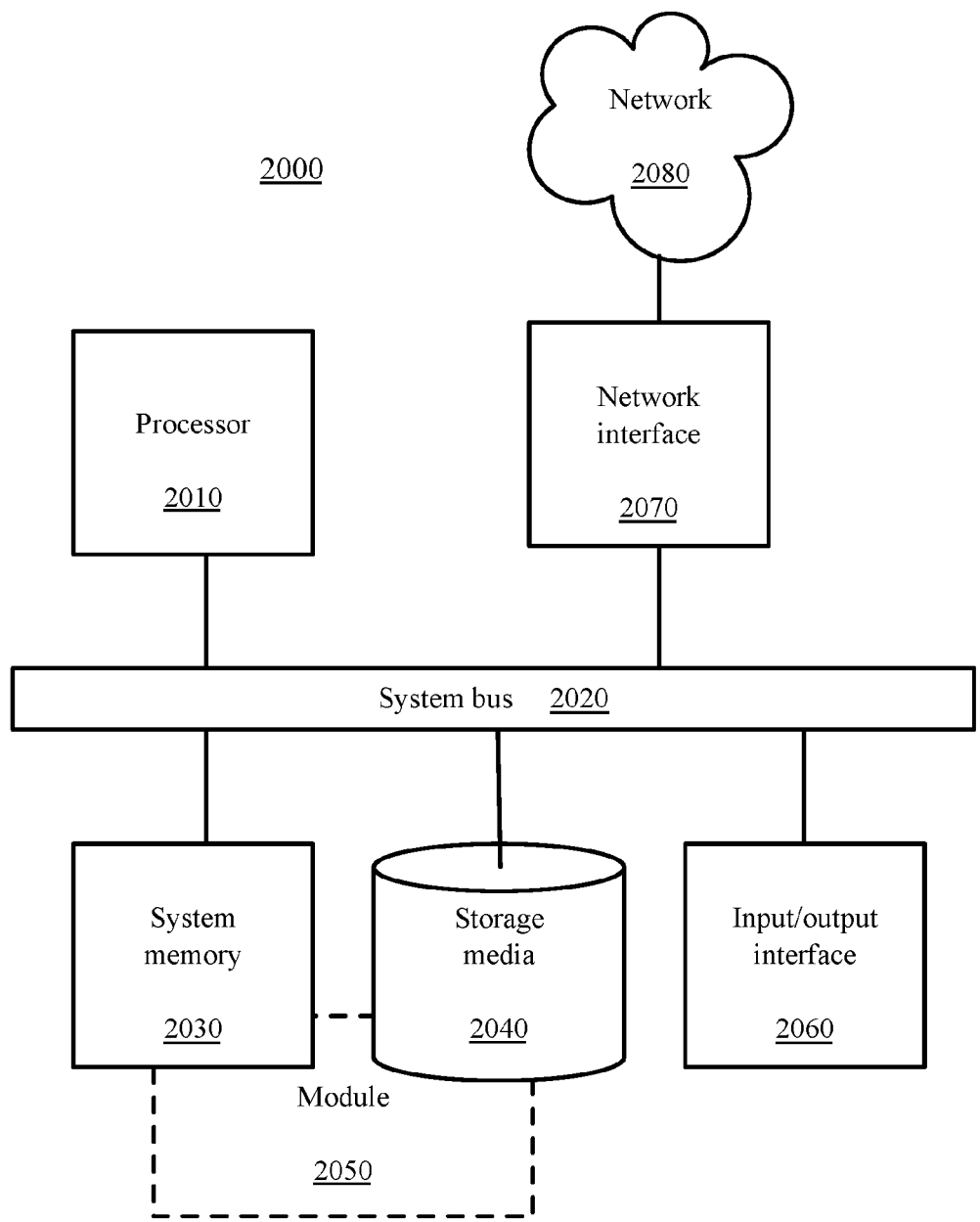
FIG. 7 is a block diagram depicting a computing machine and a module, in accordance with example embodiments.

In example embodiments, the network computing devices and any other computing machines associated with the technology presented herein may be any type of computing machine such as, but not limited to, those discussed in more detail with respect to FIG. 7. Furthermore, any functions, applications, or components associated with any of these computing machines, such as those described herein or any other others (for example, scripts, web content, software, firmware, hardware, or modules) associated with the technology presented herein may by any of the components discussed in more detail with respect to FIG. 7. The computing machines discussed herein may communicate with one another, as well as with other computing machines or communication systems over one or more networks, such as networks 105, 115. The networks 105, 115 may include any type of data or communications network, including any of the network technology discussed with respect to FIG. 7.

Example Processes

Figure 2:
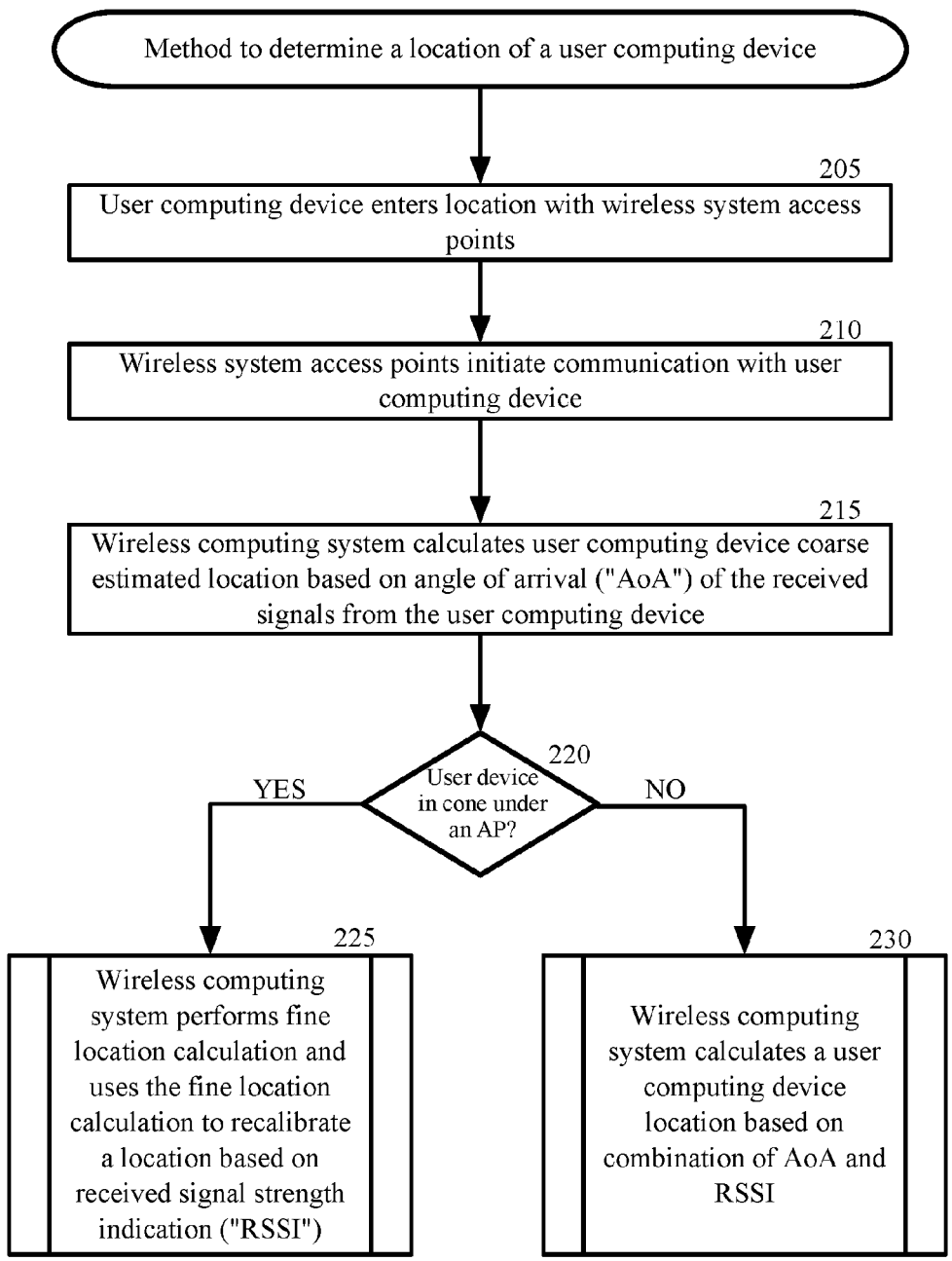
FIG. 2 is a block flow diagram depicting a method to determine a location of a user computing device, in accordance with example embodiments.
Figure 3:
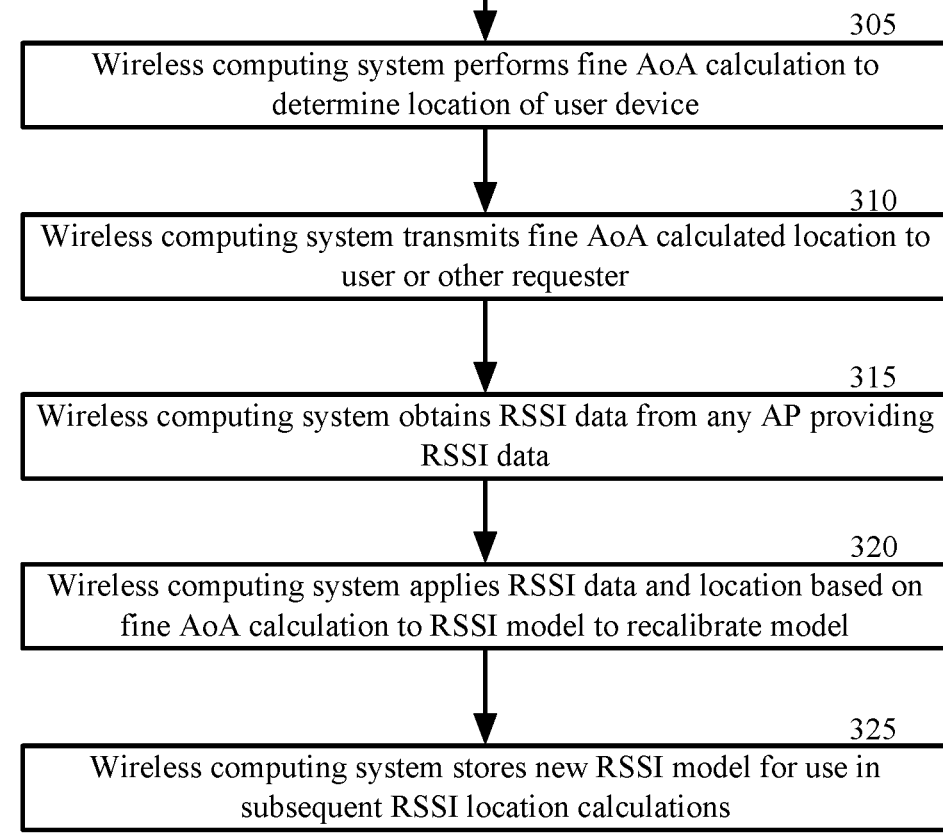
FIG. 3 is a block flow diagram depicting a method to perform a fine location determination and use the fine location determination to recalibrate a location based on received signal strength, in accordance with example embodiments.
Figure 4:
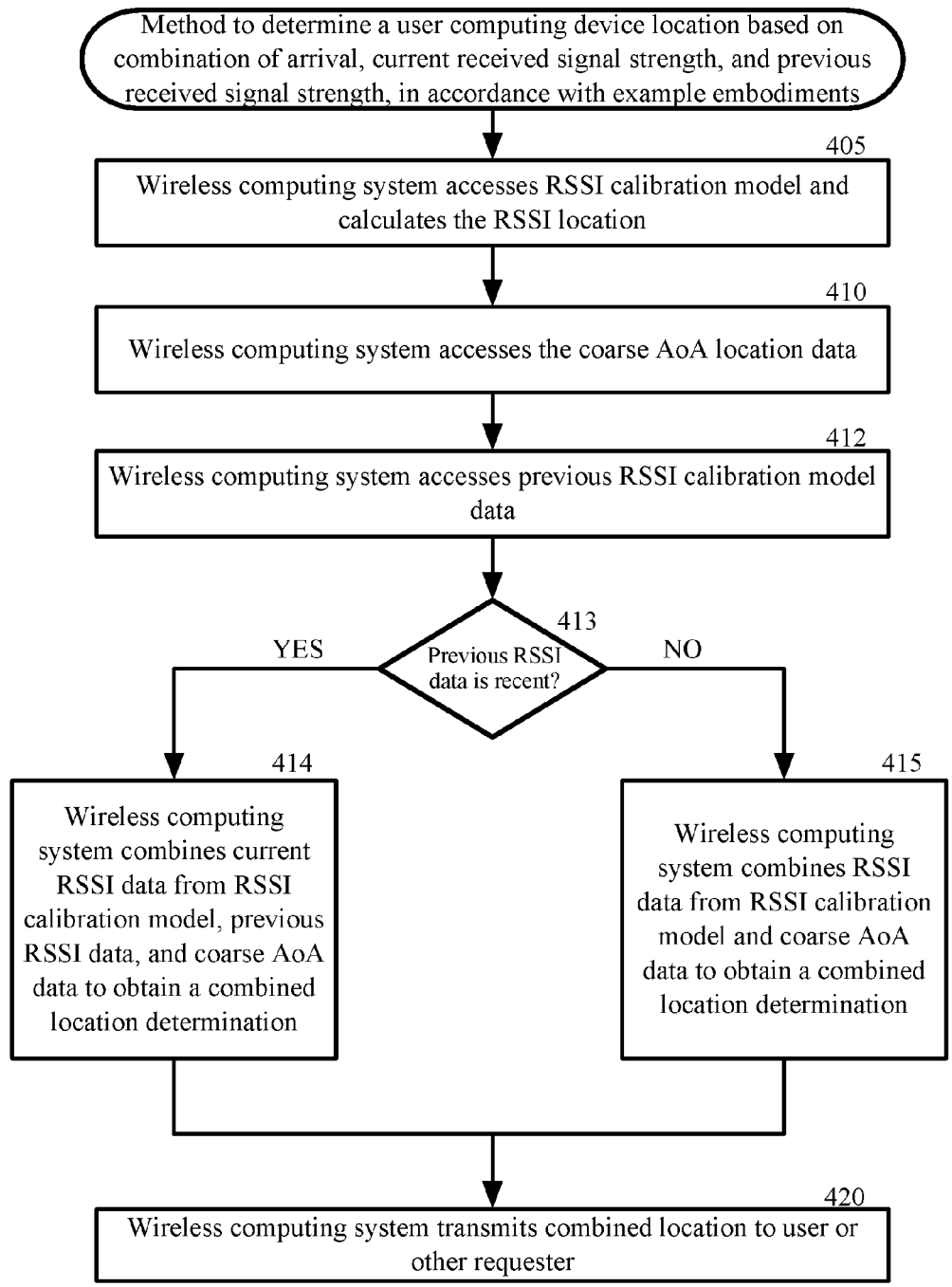
FIG. 4 is a block flow diagram depicting a method to determine a user computing device location based on a combination of signal angle of arrival, current received signal strength, and previous received signal strength, in accordance with example embodiments.

The example methods illustrated in FIGS. 2-4 are described hereinafter with respect to the components of the example operating environment 100. The example methods of FIGS. 2-4 may also be performed with other systems and in other environments.

FIG. 2 is a block flow diagram depicting a method 200 to determine a location of a user computing device 110, in accordance with example embodiments.

With reference to FIGS. 1 and 2, in block 205, a user computing device 110 enters a location with wireless system APs 124. For example, a user 101 with a user computing device 110 enters a facility including a wireless computing system 120, which comprises wireless access points 124a, 124b . . . 124n and a wireless computing system device 122. Each wireless access point ("AP") 124n may be distributed throughout a particular area of the facility or throughout the entire facility. For example, two or more APs 124n may be distributed in different sections of a mall or office building.

Each AP 124n may be situated to transmit and receive Wi-Fi or other signals in a particular area of the facility. In another example, the APs are distributed throughout indoor or outdoor areas of a hotel, an airport, an office complex, a sports area, a park, a campground, a shopping center, or any other suitable location that desires to provide a Wi-Fi signal to the general public, employees, invited guests, or any other suitable users. The Wi-Fi signal provided by the APs 124n may be free, require a fee, require a password, or any other suitable requirements. The Wi-Fi signal may use any other wireless communication technology, such as Bluetooth, infrared, cellular, or any other suitable technology.

The user 101 may enter the location serviced by the APs 101. The user 101 may have a user computing device 110, such as a mobile smartphone, that is in use or stored in a pocket, a bag, or other suitable location. In an example, the user 101 must activate a Wi-Fi service on the user computing device 110 to practice steps of the described methods.

In block 210, one or more of the APs 124n initiates a communication with the user computing device 110. Each AP 124n may transmit a beacon signal or other communication that the user computing device 110 recognizes as an invitation to initiate a communication session. In another example, the user computing device 110 may transmit a communication that the AP 124*n* recognizes as an invitation to initiate a communication session.

The user computing device 110 and each AP 124*n* may transmit identification information to each other to establish the communication session.

In block 215, the wireless computing system 120 calculates a location of the user computing device 110 based on a coarse calculation based on an angle of arrival ("AoA") of the signal received by each AP 124*n* from the user computing device 110. To obtain a location of the user computing device 110 using the AoA of the signal, the wireless computing system 120 measures the angle from which the signal arrives from the user computing device 110 with respect to each AP 124*n*. The AoA may be measured by an array of antennas on the AP 124*n* to differentiate the angle or by any other suitable method of determining the AoA. The AoA may be measured in a number of degrees from a constant direction, such as "north." Alternatively, the AoA may be a relative direction described in other suitable terms.

If two or more APs 124*n*, such as AP 124*a* and AP 124*b*, receive the signal from the user computing device 110, then the wireless computing system 120 may utilize both measurements to more accurately calculate the location of the user computing device 110. For example, the wireless computing system 120 may determine an AoA value for the user computing device 110 determined by AP 124*a* and compare that AoA value with an AoA value for the user computing device 110 determined by AP 124*b*.

By comparing the two AoA values, the wireless computing system 120 in communication with the APs 124*a*, 124*b*, calculates an estimated location of the user computing device 110. For example, the wireless computing system 120 may triangulate a position based on the differences in the received AoA values with respect to the APs 124*a*, 124*b*. In another example, any number of APs 124*n* may be used to triangulate the position of the user computing device 110, such as three, five, or ten. Typically, a greater number of APs 124*n* involved in the calculation, the greater the accuracy of the calculation.

The calculation may be based on the angle that the signal of the user computing device 110 arrives at the AP 124*n*. An array of antennas on an AP 124*n* receives the signal of the user computing device 110, and based on which of one or more of the antennas in the array receives the signal, the AP 124*n* is able to calculate the angle from which the signal arrives. The angle of arrival of the signal allows the AP 124*n* to calculate the position, relative to the AP 124*n*, that the user computing device 110 providing the signal is located. The configuration of the array allows an area in the shape of a cone under the AP 124*n* to be a location in which the calculation is more accurate than an area outside of the cone.

The calculation in block 215 is a coarse calculation to limit the amount of processing power required to perform the calculation. For example, a coarse calculation may divide the area near the APs 124*n* from which the user computing device 110 is likely to be transmitting into segments that are 3 meters by 3 meters, and then analyze each segment. The analysis of each segment will produce a probability that the user computing device 110 is in that segment, such as a 30% chance or a 70% chance.

A coarse calculation will not provide as accurate, or as thorough, of an analysis of the received data as a fine calculation provides. The coarse calculation is typically accurate to within 7 to 10 meters. A fine calculation provides more accurate and thorough data, but may require more processing capacity and processing usage. If an area to be analyzed to determine the most likely location of a user computing device 110 is large, then a fine calculation over that large area will require a burdensome amount of processing by the wireless computing system 120. The fine calculation may use a similar calculation method as a coarse calculation, but on a smaller area with smaller sections. When analyzing data from a smaller section, the same amount of processing capacity will produce a more accurate result. Thus, a fine calculation may be reserved for a smaller area to conserve processing capacity. A fine calculation will be described in more detail in block 305 with respect to FIG. 3.

In block 220, the wireless computing system 120 determines if the user computing device 110 is likely to be positioned under a cone of reception of a particular AP 124*n*. The "cone" under an AP 124*n* may be envisioned as an area that is substantially underneath an AP 124*n*, and thus a user computing device 110 in such a position would be in communication via a steady, uninterrupted signal from the AP 124*n*. For example, the AP 124*n* may be placed on the ceiling of the facility. The higher the AP 124*n* is positioned above the user computing device 110, the wider the area under the AP 124*n* that is considered to be in communication via a steady, uninterrupted communication between the user computing device 110 and the AP 124*n*. As the area under the AP 124*n* with the steady, uninterrupted signal grows larger as the user computing device 110 is farther away from the AP 124*n*, the area under the AP 124*n* may be envisioned as a cone.

In an example, the user computing device 110 may be determined to be under a cone of an AP 124*n* if the signal from the user computing device 110 is received by every antenna on the AP 124*n*. In an example, the AP 124*n* has ten antennas that are configured to receive a signal from a slightly different angle/direction from each of the other antennas. A signal approaching from outside of the cone may not be received by all of the antennas. If the signal is received by all of the antennas, then the sender of the signal, such as the user computing device 110, is likely to be inside the cone.

In another example, to determine if the user computing device 110 is likely to be in the cone, the wireless computing system 120 compares the location of the user computing device 110 from the coarse AoA calculation to the known location of the cone. For example, if the cone expands outward in each direction at a 45 degree angle from the vertical underneath an AP 124*a*, then the wireless computing system 120 can calculate the cone dimensions at floor level, or at any suitable level, by using a known height above the floor of the AP 124*a*. For example, if the AP 124*a* is 30 feet above the floor of the facility, then the cone would meet the floor at a circle with a radius of 30'*sin(45 Deg.) with the center of the circle directly below the AP 124*a*. If the user computing device 110 location is determined to be inside this circle, then the user computing device 110 is determined to be within the cone. A similar technique may be used to determine the area of a circle created by the cone at any other suitable height above the floor, such as three feet above the floor.

Figure 5:
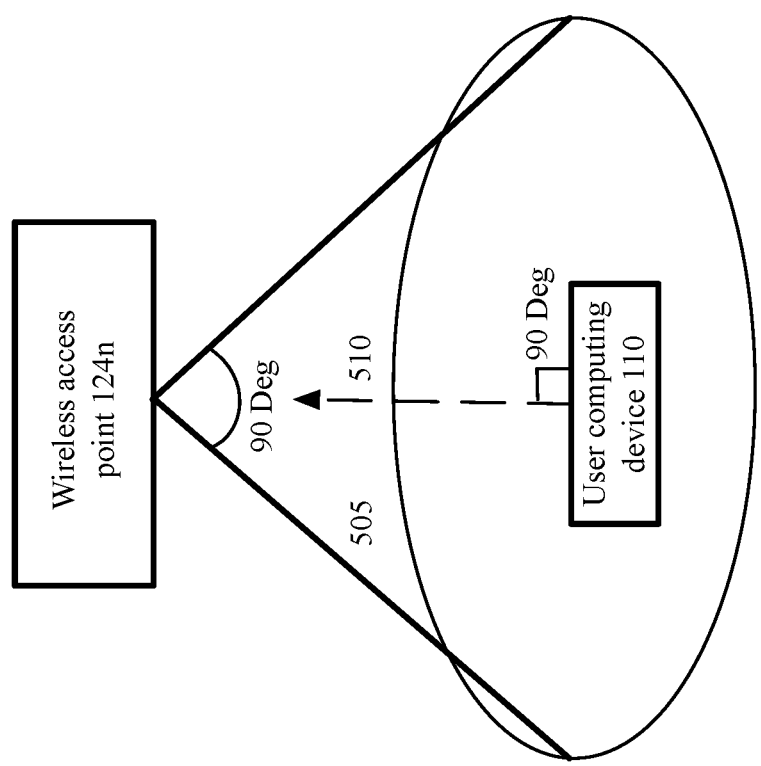
FIG. 5 is an illustration of a region in which a user computing device is able to conduct a steady, uninterrupted communication with a wireless access point, in accordance with example embodiments.

FIG. 5 provides an illustration of a cone in which a user computing device 110 is able to conduct a steady, uninterrupted communication with an AP 124*n*, in accordance with example embodiments. In the example, the steady, uninterrupted communication is broadcast and received from the AP 124*n* in a 90-degree range under the AP 124*n*. The range forms a "cone" 505 under the AP 124*n* that expands and is larger as the signal moves away from the AP 124*n*. The user computing device 110 is shown within the cone 505 under the AP 124n. The user computing device 110 would thus receive the steady, uninterrupted signal from the AP 124n.

Figure 6:
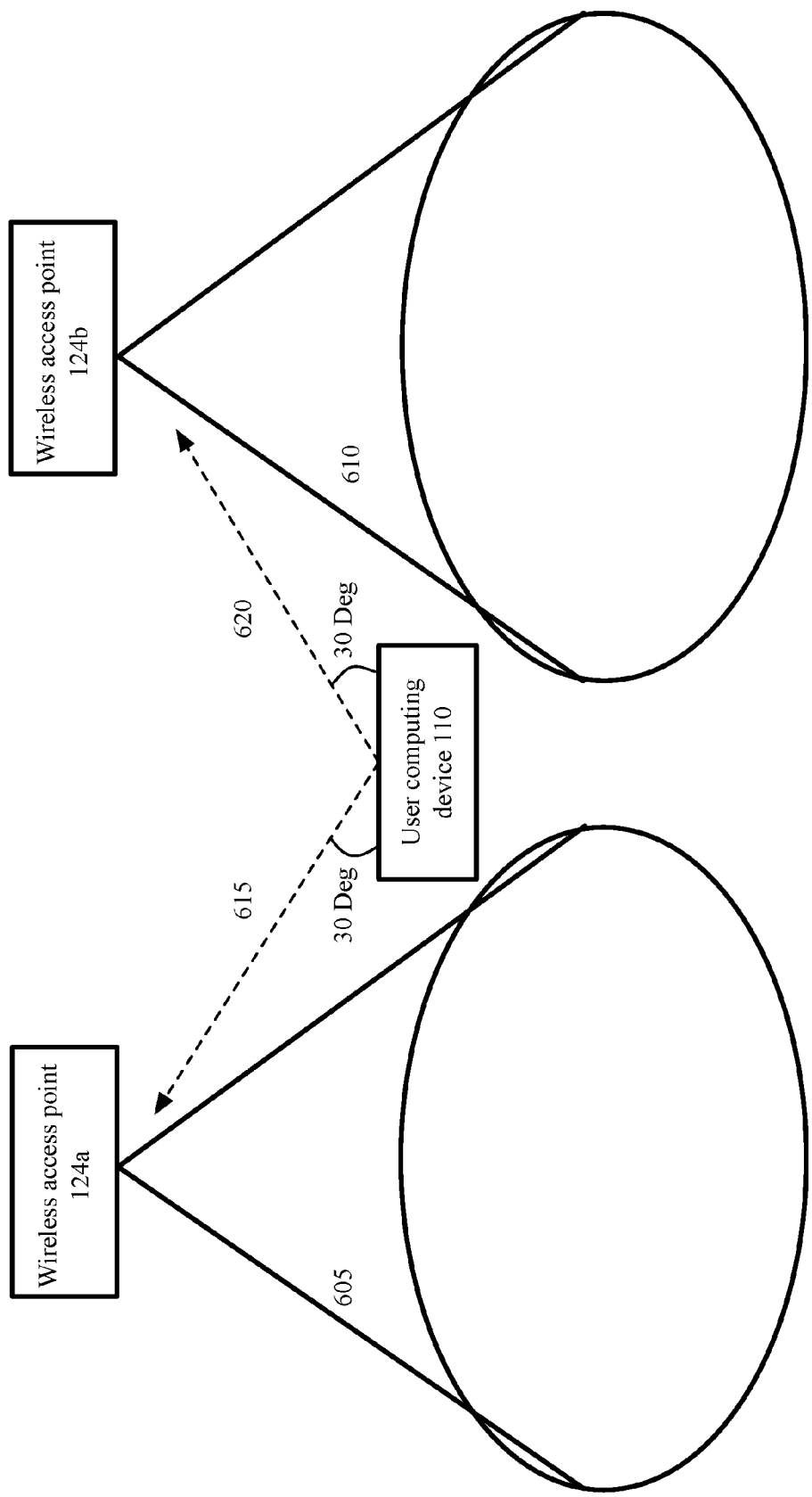
FIG. 6 is an illustration of a user computing device in communication with two wireless access points, in accordance with example embodiments.

FIG. 6 provides an illustration of a region in which a user computing device 110 is not able to conduct a steady, uninterrupted communication with an AP 124n, in accordance with example embodiments. In the example, the steady, uninterrupted communication is broadcast and received from the APs 124a-b in 90-degree ranges under each AP 124a-b. The range forms "cones" 605, 610 under each of the APs 124a-b that expand and are larger as the signal moves away from each AP 124a-b. The user computing device 110 is shown to be outside of both of the cones 605, 610. The user computing device 110 would thus likely be unable to receive the steady, uninterrupted signal from either of the APs 124a-b. However, the user computing device 110 may still be able to communicate with the APs 124a-b, but the signal may not be as steady and uninterrupted as when the user computing device 110 is directly under an AP 124n.

The cone 505 under AP 124n in FIG. 5 and cones 605, 610 under the APs 124a-b in FIG. 6 are shown directed downward as a right circular cone. The boundary of the cone projects from the apex of the cone in a 90-degree range as shown. The area within the circles is within the cone, and a user computing device 110 in this area would be considered to receive the steady, uninterrupted signal from the AP 124n and to transmit a steady, uninterrupted signal to the AP 124n.

The dashed line 510 in FIG. 5 represents the signal from the user computing device 110 being transmitted to the AP 124n. The dashed lines 615, 620 in FIG. 6 represent the signal from the user computing device 110 being transmitted to the APs 124a-b. The dashes of line 510 are shown as bigger than the dashes of lines 615, 620 to represent that a signal from a user computing device 110 that is under the cone is stronger and more stable than a signal from a user computing device 110 that is not under the cone. The angle of dashed line 510 is shown as 90 degrees from horizontal, or substantially vertical. This angle indicates that the user computing device is directly underneath the AP 124n. The angle of the dashed lines 615, 620 is shown as being 30 degrees from horizontal. This angle indicates that the user computing device 110 is not within a cone under the APs 124a-b. The angle of the dashed lines 615, 620 would provide a weaker signal to the APS 124a-b.

Returning to FIG. 2, if the user computing device 110 is determined to be within the configured cone under the AP 124n, then the method 200 proceeds to block 225.

In block 225, the wireless computing system 120 performs fine location calculation and uses the fine location calculation to recalibrate a location based on received signal strength. Block 225 is described in greater detail with respect to FIG. 3.

FIG. 3 is a block flow diagram depicting a method 225 to perform a fine location determination and use the fine location determination to recalibrate a location based on received signal strength, in accordance with example embodiments, in accordance with example embodiments.

In block 305, upon determining that the user computing device 110 is likely to be within the cone under a particular AP 124n, the wireless computing system 120 performs a fine AoA calculation to determine the location of the user computing device 110. The fine calculation uses the AoA of the signal from the user computing device 110 to the one or more APs 124n in a similar manner as described with respect to the coarse calculation from block 215. However, the fine calculation is performed on a much smaller area because the system has already calculated a general area in which the user computing device 110 is likely to be located. Since the user computing device 110 is likely to be underneath the particular AP 124n, then the area that must be searched is reduced significantly. Because a much smaller area is to be searched, the fine calculation performs a more thorough analysis of the data and obtains a more accurate result for each section.

For example, the fine calculation segments an area to be searched into much smaller segments than the coarse calculation and applies the calculation to each segment. To search the segments, the wireless computing system 120 analyzes the received signals and calculates a likelihood that the user computing device 110 is located in each of the segments. Based on the results of the calculation, the wireless computing system 120 may select the segment with the highest likelihood as the calculated location of the user computing device 110.

For example, a coarse calculation may divide the area into segments that are 3 meters by 3 meters, and then search each segment. However, a fine calculation may divide the area into segments that are 0.5 meters by 0.5 meters, and then search each segment. Because of the smaller segments, the fine calculation would produce a more accurate result. The results of the fine calculation typically produce a location that is accurate to within 2 meters. Performing a fine calculation with segments that are 0.5 meters by 0.5 meters over a larger area would be burdensome for the processor of the wireless system.

In block 310, the wireless computing system 120 transmits the fine AoA calculated location to the user computing device 110 or other requester. After selecting the best result, the wireless computing system 120 communicates the determined location of the user computing device 110 to the user computing device 110. The communication may be transmitted along the already established communication channels between the user computing device 110 and the AP 124n, such as Wi-Fi. The user computing device 110 displays location data to the user 101 or provides the location data to any other suitable application of the user computing device, such as a mapping application, shopping application, or advertising application.

In an example, the wireless computing system 120 provides the determined location data to the user computing device 110 along with instructions to display the location to the user 101 on a mapping application, or other application, on the user computing device. In another example, the user computing device 110 stores the location data until the user 101 or an application requests the data. For example, if the user 101 is using a mapping application to monitor the location of the user 101 at a park, the mapping application may periodically or continuously receive location data from the wireless computing system 120 and display the location data on the mapping application. In another example, the location data may be received by the user computing device 110 and accessed by a shopping application. The shopping application accesses the location data and uses the location data to provide location specific coupons and offers to the user 101 via the shopping application. Any other application or device authorized by the user 101 may utilize the location data.

In block 315, the wireless computing system 120 obtains received signal strength indication ("RSSI") data from any AP 124n providing RSSI data that is obtained from the signal provided by the user computing device 110. The RSSI is a measurement made by the AP 124n of the power of the signal received from the user computing device 110. For example, when an antenna of the AP 124*a* receives a communication from the user computing device 110, the AP 124*a* determines the power of the incoming signal. The AP 124*a* may convert the power into a scale, such as 0 to 100%, based on the power expected from a category of device to which the user computing device 110 belongs. For example, if the user computing device 110 is a smartphone, then the AP 124*a* may compare the power of the received signal to a table showing the minimum and maximum signals that are expected from a smartphone. The AP 124*a* may identify the RSSI value from the chart associated with the received power. Thus, the AP 124*a* can assign an RSSI value to the received signal, such as 75%. Any other suitable scale may be used for the RSSI value. In example embodiments, the RSSI value may be a power of the received signal measured in milliwatts.

After performing a fine AoA location calculation, the system computes the distance of this fine AoA location calculation from all APs 124*n* that report RSSI for this location estimate. Typically, the wireless computing system 120 may be able to determine the distance from the AP 124*n* that the user computing device 110 is located based on the RSSI. For example, the RSSI value will decrease the farther away from the AP 124*n* that the user computing device 110 is located. As a user computing device 110 gets closer to an AP 124, the signal strength, and thus the RSSI value, typically increases.

The wireless computing system 120 may compare the RSSI value with the RSSI value determined for the user computing device 110 by another AP 124*n*, such as AP 124*b*. For example, wireless computing system 120 may determine an RSSI value for the user computing device 110 and compare the RSSI value with an RSSI value for the user computing device 110 determined by AP 124*b*. By comparing the two RSSI values, the wireless computing system 120 estimates a location of the user computing device 110. For example, the wireless computing system 120 may triangulate a position based on the differences in the received RSSIs. In another example, any number of APs 124*n* may be used to triangulate the position of the user computing device 110, such as three, five, or ten. For example, three APs 124*n* may be in communication with the user computing device 110. The wireless computing system 120 may triangulate a position based on the differences in the received RSSIs.

Typically, the RSSI-based location is accurate to within five to eight meters.

In block 320, the wireless computing system 120 applies the received RSSI data and the location and location based on the fine AoA calculation of the user computing device 110 to the RSSI model to recalibrate the model. The wireless computing system 120 maintains an algorithm or other mathematical model of the location of the user computing device 110 based on the RSSI values received from the APs 124*n*. For example, the wireless computing system 120 may accumulate a set of RSSI values and calculated locations for the user computing device 110 and calculate a best fit curve of the data. The curve may be used to predict a location of the user computing device 110 when a new set of RSSI values are received.

When the user computing device 110 is under a cone of an AP 124*n* and an accurate location is calculated, received RSSI values may be incorporated into the model to update the model and provide more accurate RSSI-based locations based on the AoA calculated location. For example, the received RSSI values and the received location may be added to the database of RSSI values and locations. A best fit curve or other type of mathematical modeling functions may be applied to the updated database to produce an updated model. In an example, more recent data added to the database is given more weight than earlier data, as the locations of the APs 124*n* or other factors may have changed.

In a typical system, a default model may be configured for the user computing device 110. The user 101 may manually configure the model by moving about the area and recording the RSSI values and corresponding locations. This process is cumbersome and time consuming. The automatic updating of the system described previously provides a system where the accuracy may be improved with the addition of new data and without further manual calibration.

In block 325, the wireless computing system 120 stores the updated RSSI model for use in subsequent RSSI location calculations. The details of the combination of the AoA and RSSI calculations are described in greater detail with respect to block 230 of FIG. 2.

Returning to FIG. 2, if the user computing device 110 is determined in block 220 not to be within the cone under the AP 124*n*, then the method 200 proceeds to block 230. In block 230, the wireless computing system 120 calculates a user computing device 110 location based on a combination of AoA and RSSI. The details of block 230 are described in greater detail with respect to method 230 of FIG. 4.

FIG. 4 is a block flow diagram depicting a method 230 to determine a user computing device location based on a combination of signal angle of arrival, current received signal strength, and previous received signal strength, in accordance with example embodiments.

In block 405, the wireless computing system 120 accesses the RSSI calibration model and calculates a location of the user computing device 110 based on current RSSI. For example, when the wireless computing system 120 determines that the user computing device 110 is likely not to be located under the cone of an AP 124*n*, the wireless computing system 120 identifies a particular RSSI calibration model. The model may be specific to the type of device, the type of wireless signal the device produces, or any other characteristics of the user computing device 110 or the wireless computing system 120. The model may be stored on the wireless computing system 120, in a cloud based storage location, on the user computing device 110, or in any suitable location. The wireless computing system 120 uses the RSSI calibration model to calculate an RSSI-based location of the user computing device 110.

For example, to calculate the RSSI-based location of the user computing device 110, the wireless computing system 120 obtains RSSI data from any AP 124*n* providing RSSI data that is obtained from the signal provided by the user computing device 110. The RSSI is a measurement made by the AP 124*n* of the strength of the signal received from the user computing device 110. For example, when an antenna of the AP 124*a* receives a communication from the user computing device 110, the AP 124*a* determines the power of the incoming signal. The AP 124*a* may convert the power into a scale, such as 0 to 100%, based on the power expected from a category of device to which the user computing device 110 belongs. For example, if the user computing device 110 is a smartphone, then the AP 124*a* may compare the power of the received signal to a table showing the minimum and maximum signals that are expected from a smartphone. The AP 124*a* may identify the RSSI value from the chart associated with the received power. Thus, the AP 124*a* can assign an RSSI value to the received signal, such as 75%. Any other suitable scale may be used for the RSSI value. In example embodiments, the RSSI value may be a power of the received signal measured in milliwatts, or converted to a distance from the AP 124*a*.

Based on the RSSI value for the received signal, the wireless computing system 120 calculates an estimated location of the user computing device 110 using the RSSI calibration model. For example, the model can calculate that the RSSI value corresponds to a certain distance from the measuring AP 124*a*, which corresponds to one or more locations with respect to the AP 124*a*. If multiple APs 124*n* receive the signal, then the model also can triangulate calculated distances with respect to each of the multiple APs 124*n* and determine an intersection of the distance vectors from each AP 124*n* as the location of the user computing device 110.

In block 410, the wireless computing system 120 accesses the coarse AoA location data calculated in block 215. The coarse AoA location data is obtained as the user computing device 110 is not in the cone of an AP 124*n* and thus a fine calculation is not performed.

In block 412, the wireless computing system 120 accesses RSSI data from a preceding iteration of block 405 of this method 230. If the wireless computing system 120 has not previously determined the location of the user computing device 110, then RSSI data from a preceding iteration of this method 200 does not exist for the user computing device 110. However, if the wireless computing system 120 has previously determined the location of the user computing device 110, then the wireless computing system reads the previously determined location and corresponding time of that determination.

For example, when a user 101 moves about the facility of the wireless computing system 120, the method initiates a location calculation as described in method 200 periodically based on a configured time period. For example, the method 200 may initiate every 5 seconds, 10 seconds, 30 seconds, or any suitable time period. In another example, the method 200 initiates when a certain application is opened or accessed, or when a new AP 124*n* receives a signal from the user computing device 110. When the wireless computing system 120 accesses the previous calculation, a timestamp for the previous calculation is also accessed to determine how much time has elapsed since the previous calculation.

In block 413, the wireless computing system 120 determines if the previous RSSI data is sufficiently recent. That is, the wireless computing system 120 analyzes the timestamp on the preceding RSSI data and compares the timestamp to the current time. If the timestamp was from a time earlier than a configured time interval, or if previous RSSI data does not exist for the user computing device 110, then the wireless computing system 120 will not use the previous RSSI data. For example, if the configured time period dictates that the wireless computing system 120 will only use the previous RSSI data if the data is less than 30 seconds old, then a determination that the previous RSSI data is 50 seconds old will cause the wireless computing system 120 to ignore the previous RSSI data and not to use the previous RSSI data in the current location calculation. The configured time threshold may be any suitable amount of time, such as 10 seconds, 30 seconds, or 1 minute. If, in block 413, the wireless computing system 120 determines that the previous RSSI data was calculated earlier than the configured time period or otherwise does not exist, then the method 230 proceeds to block 415.

In block 415, the wireless computing system 120 combines the current RSSI data location from the RSSI calibration model as described in block 405 and the coarse AoA data location to obtain a combined location calculation for the user computing device 110. The wireless computing system 120 merges the two data sources to perform a new calculation to determine the location of the user computing device 110. For example, the wireless computing system 120 averages the current RSSI-calculated location and the AoA-calculated location to obtain an average location measurement, which is used as the calculated location of the user computing device 110.

The combined location calculation typically produces an accuracy that is better than either the RSSI calculation or the coarse AoA calculation individually for a user computing device this in not within the cone of a particular AP 124*n*. The accuracy may not be better than a fine AoA calculation. However, as the fine AoA calculation is not available due to the location of the user computing device 110, the combined location calculation provides results that may be more accurate than the available methods.

In another example, the wireless computing system 120 merges the data from the RSSI measurements of the APs 124*n* with the data from the AoA measurements of the APs 124*n*. A calculation may be performed based on the combined data or a new combined model may be created based on the data. The location of the user computing device 110 may be determined by applying the newly received data to the combined model. In an example, the wireless computing system 120 corrects the RSSI data based on the AoA data. In another example, the wireless computing system 120 corrects the AoA data based on the RSSI data. In another example, the wireless computing system 120 creates a new calculation method that utilizes both data sources and calculates a location that is more accurate than either of the data sources.

In an example, the wireless computing system 120 divides the probable location of the user computing device 110 into sections. For example, an AoA coarse calculation may divide the area near the APs 124*n* from which the user computing device 110 is likely to be transmitting into segments that are 3 meters by 3 meters, and then search each segment. The analysis of each segment will produce a probability that the user computing device 110 is in that segment, such as a 30% chance or a 70% chance. The wireless computing system 120 may then further refine the probability for each of the segments based on the determined RSSI location calculations or values. The wireless computing system 120 may combine the probabilities, average the probabilities, normalize the probabilities, or perform other calculations to compare or combine the results of the AoA and the RSSI calculations.

Referring back to block 413, if the wireless computing system 120 determines that the previous RSSI data was calculated within the configured time period, then the method 230 proceeds to block 414.

In block 414, the wireless computing system 120 combines the current RSSI data from the RSSI calibration model discussed in block 405, the previous RSSI data from the RSSI calibration model discussed in blocks 412, and the coarse AoA data to obtain a combined location calculation for the user computing device 110. The wireless computing system 120 merges the three data sources to perform a new calculation to determine the location of the user computing device 110. For example, the wireless computing system 120 averages the two RSSI-calculated locations and the AoA-calculated location to obtain an average location measurement, which is used as the calculated location of the user computing device 110.

In another example, the wireless computing system 120 identifies the location calculated by the previous RSSI data and ensures that the coarse calculation area for the AoA calculation includes that previous RSSI location.

The wireless computing system 120 combines the three data sources in any suitable manner to create a combined calculated location. Using the previous RSSI-calculated location reduces error in the results of the combined calculation because the third data point from a previous calculation provides a smoothing effect on the results and reduces the effect of temporary signal interference and other signal obstructions.

In alternate embodiments, the combined calculation may utilize other stored data in addition to, or instead of, any of the three sources of data listed herein. For example, the wireless computing system 120 may utilize the previously calculated coarse AoA from the last location calculation instead of the previously calculated RSSI based location. In another example, the wireless computing system may utilize the previous combined calculation from any combination of the AoA data, RSSI data, or any other suitable data. In these examples, using a previously calculated location also reduces error in the results of the combined calculation.

The wireless computing system 120 may combine any or all of the previous data with the current data to perform the calculation. The calculation may use the previous data in any suitable manner, such as by ensuring that the new search area includes the location from the previous data or including the previous location data in a calculation of an average location.

The combined location calculation typically produces an accuracy that is better than either the RSSI calculation or the coarse AoA calculation individually for a user computing device 110 that is not within the cone of a particular AP 124n. This accuracy may not be better than a fine AoA calculation. However, as the fine AoA calculation is not available due to the location of the user computing device 110, the combined location calculation provides results that may be more accurate than the available methods. The combined location calculation as described in block 414 incorporating the previous RSSI based location produces an accuracy that is better than the combined location calculation using only the coarse AoA calculation and the current RSSI based location as described in block 415. In testing, using the combined location calculation as described in block 414 has increased accuracy over the calculation as described in block 415.

In another example technique to calculate the combined location, the wireless computing system 120 merges the data from the current and previous RSSI measurements of the APs 124n with the data from the AoA measurements of the APs 124n. A calculation may be performed based on the combined data or a new combined model may be created based on the data. The location of the user computing device 110 may be determined by applying the newly received data to the combined model. In an example, the wireless computing system 120 corrects the current RSSI data based on the AoA data and the previous RSSI data. In another example, the wireless computing system 120 corrects the AoA data based on the current RSSI data and the previous RSSI data. In another example, the wireless computing system 120 creates a new calculation method that utilizes all three data sources and calculates a location that is more accurate than any one of the data sources.

In an example, the wireless computing system 120 divides the probable location of the user computing device 110 into sections. For example, an AoA coarse calculation may divide the area near the APs 124n from which the user computing device 110 is likely to be transmitting into segments that are 3 meters by 3 meters, and then search each segment. The wireless computing system 120 ensures that the previous RSSI calculated location is represented in at least one of the sections. If not, the wireless computing system 120 adjusts the area bounding the segments to include the previous RSSI calculated location. The analysis of each segment will produce a probability that the user computing device 110 is in that segment, such as a 30% chance or a 70% chance. The wireless computing system 120 may then further refine the probability for each of the segments based on the determined RSSI location calculations or values. The wireless computing system 120 may combine the probabilities, average the probabilities, normalize the probabilities, or perform other calculations to compare or combine the results of the AoA and the RSSI calculations. From either block 414 or 415, the method 230 proceeds to block 420. In block 420, the wireless computing system 120 transmits the combined location to the user computing device 110 or other requester. The AP 124n communicates the determined location of the user computing device 110 to the user computing device 110. The communication may be transmitted along the already established communication channels between the user computing device 110 and the AP 124, such as Wi-Fi or Bluetooth. The user computing device 110 displays location data to the user 101 or provides the location data to any other suitable application of the user computing device 110, such as a mapping application, shopping application, or advertising application. The location may be provided along with the Wi-Fi service, or other wireless service, that the wireless system is providing to the user computing device 110 to allow the user access to the Internet, beacons, or other wireless services. In an example, the wireless computing system 120 provides the determined location data to the user computing device 110 along with instructions to display the location to the user 101 on a mapping application, or other application, on the user computing device. In another example, the user computing device 110 stores the location data until the user 101 or an application requests the data. For example, if a user 101 is using a mapping application to monitor the location of the user 101 at a park, the mapping application may periodically or continuously receive location data from the wireless computing system 120 and display the location data on the mapping application. In another example, the location data may be received by the user computing device 110 and accessed by a shopping application. The shopping application accesses the location data and uses the location data to provide location specific coupons and offers to the user 101 via the shopping application. Any other application or device authorized by the user 101 may utilize the location data.

Example Systems

FIG. 7 depicts a computing machine 2000 and a module 2050 in accordance with example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a wearable computer, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read-only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, acts can be performed in a different order, in parallel with one another, omitted entirely, and/or combined between different example embodiments, and/or additional acts can be performed, without departing from the scope and spirit of various embodiments. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A method, comprising:
receiving, by at least one wireless computing system access point of a computing system, a wireless signal from a user computing device;
calculating, using the computing system, a first estimated location of the user computing device based on an angle of arrival of the received wireless signal with respect to each of the at least one wireless computing system access point;
calculating, using the computing system, a current received signal strength indicator ("RSSI") estimated location of the user computing device based on a signal strength of the received wireless signal with respect to each of the at least one wireless computing system access point;
determining, using the computing system, whether an elapsed time between calculating the current RSSI estimated location of the user computing device and a previously calculated RSSI estimated location of the user computing device is within a configured time interval;
in response to a determination that an elapsed time between calculating the current RSSI estimated location of the user computing device and the previously calculated RSSI estimated location of the user computing device is within the configured time interval, calculating, using the computing system, a second estimated location of the user computing device based on a combination of results of the first estimated location of the user computing device based on the angle of arrival of the received wireless signal with results of the previously calculated RSSI estimated location of the user computing device and the current RSSI estimated location of the user computing device; and
transmitting, using the computing system and to the user computing device, location data related to the second estimated location to indicate an actual location of the user computing device.

2. The computer-implemented method of claim 1, wherein combining the results of the first estimated location of the user computing device based on the angle of arrival of the received wireless signal with results of the previously calculated RSSI estimated location of the user computing device and the current RSSI estimated location of the user computing device comprises averaging the results.

3. The computer-implemented method of claim 1, wherein the location data transmitted to the user computing device comprises instructions to display the second estimated location of the user computing device on a mapping application executing on the user computing device.

4. The computer-implemented method of claim 1, wherein the wireless signal is a Wi-Fi signal.

5. The computer-implemented method of claim 1, wherein the second estimated location of the user computing device is more accurate than the first estimated location of the user computing device.

6. The computer-implemented method of claim 1, wherein the signal from the user computing device is received by a plurality of access points and received signal strength values are communicated to the computing system from each of the plurality of access points.

7. The computer-implemented method of claim 1, further comprising:
in response to a determination that an elapsed time between calculating the current RSSI estimated location of the user computing device and the previously calculated RSSI estimated location of the user computing device is not within the configured time interval, calculating, using the computing system, a third estimated location of the user computing device based on a combination of results of the first estimated location of the user computing device based on the angle of arrival of the received wireless signal with results of the current RSSI estimated location of the user computing device; and
transmitting, using the computing system and to the user computing device, location data related to the third estimated location to indicate an actual location of the user computing device.

8. A tangible, non-transitory, computer-readable media having software encoded thereon, the software when executed by a processor operable to:
receive, by at least one wireless computing system access point, a wireless signal from a user computing device;
calculate a first estimated location of the user computing device based on an angle of arrival of the received wireless signal with respect to each of the at least one wireless computing system access point;
calculate a first received signal strength indicator ("RSSI") estimated location of the user computing device based on a signal strength of the received wireless signal with respect to each of the at least one wireless computing system access point;
calculate a second estimated location of the user computing device based on a combination of the first estimated location of the user computing device with the results of the calculated first RSSI estimated location of the user computing device;
transmit, to the user computing device, location data related to the second estimated location to indicate an actual location of the user computing device;
receive a second wireless signal from the user computing device;
calculate a third estimated location of the user computing device based on an angle of arrival of the second received wireless signal with respect to each of the at least one wireless computing system access point;
calculate a second RSSI estimated location of the user computing device based on a received signal strength values of the received wireless signal with respect to each of the at least one wireless computing system access point;
determine whether an elapsed time between calculating the second RSSI estimated location of the user computing device and the first RSSI estimated location of the user computing device is within a configured time interval;
upon a determination that an elapsed time between calculating the first RSSI estimated location of the user computing device and the second RSSI estimated location of the user computing device is within the configured time interval, access the first RSSI estimated location of the user computing device;
calculate a fourth estimated location of the user computing device based on a combination of results of the calculation based on a combination of results of the third estimated location of the user computing device based on the angle of arrival of the received wireless signal with results of the first RSSI estimated location of the user computing device and the second RSSI estimated location of the user computing device; and
transmit, to the user computing device, location data related to the fourth estimated location to indicate an actual location of the user computing device.

9. The computer-readable media of claim 8, wherein combining the results of the third estimated location of the user computing device based on the angle of arrival of the received wireless signal with results of the first RSSI estimated location of the user computing device and the second RSSI estimated location of the user computing device comprises averaging the results.

10. The computer-readable media of claim 8, wherein the location data related to the fourth estimated location transmitted to the user computing device comprises instructions to display the fourth estimated location of the user computing device on a mapping application executing on the user computing device.

11. The computer-readable media of claim 8, wherein the wireless signal is a Wi-Fi signal.

12. The computer-readable media of claim 8, wherein the fourth estimated location of the user computing device is more accurate than the second estimated location of the user computing device.

13. The computer-readable media of claim 8, wherein the signal from the user computing device is received by a plurality of access points and received signal strength values are communicated to the computing system from each of the plurality of access points.

14. A system, comprising:
a storage device; and
a processor communicatively coupled to the storage device, wherein the processor executes application code instructions that are stored in the storage device to cause the system to:
receive, by at least one wireless computing system access point, a wireless signal from a user computing device;
calculate a first estimated location of the user computing device based on an angle of arrival of the received wireless signal with respect to each of the at least one wireless computing system access point;
calculate a current received signal strength indicator ("RSSI") estimated location of the user computing device based on a received signal strength values of the received wireless signal with respect to each of the at least one wireless computing system access point; and
calculating a second estimated location of the user computing device based on a combination of results of the first estimated location of the user computing device based on the angle of arrival of the received wireless signal with results of the previously calculated RSSI estimated location of the user computing device and the current RSSI estimated location of the user computing device.

15. The system of claim 14, wherein combining the results of the first estimated location of the user computing device based on the angle of arrival of the received wireless signal with results of the previously calculated RSSI estimated location of the user computing device and the current RSSI estimated location of the user computing device comprises averaging the results.

16. The system of claim 14, wherein the wireless signal is a Wi-Fi signal.

17. The system of claim 14, wherein the second estimated location of the user computing device is more accurate than the first estimated location of the user computing device.

18. The system of claim 14, wherein the signal from the user computing device is received by a plurality of access points and received signal strength values are communicated to the computing system from each of the plurality of access points.

19. The system of claim 14, further comprising application code instructions to transmit, to the user computing device, location data related to the second estimated location to indicate an actual location of the user computing device.

20. The system of claim 14, further comprising application code instructions to:

calculating, using the computing system, a third estimated location of the user computing device based on a combination of results of the calculation based on the angle of arrival of the received subsequent signal with results of an application of the calculated received signal strength values of the subsequent signal to the updated received signal strength model; and transmitting, using the computing system and to the user computing device, location data related to the third estimated location to indicate an actual location of the user computing device.

\* \* \* \* \*